E. SCHNEIDER.
APPARATUS FOR THE APPLICATION OF HYDRAULIC PRESSURE TO THE INTERIOR OF A TUBE BEING SHAPED BY THE SELF HOOPING PROCESS.
APPLICATION FILED MAR. 31, 1919.

1,338,871.

Patented May 4, 1920.

Inventor:
Eugene Schneider
by
Marro, Cameron, Lewis & Massie
Attys.

Fig.6.

E. SCHNEIDER.
APPARATUS FOR THE APPLICATION OF HYDRAULIC PRESSURE TO THE INTERIOR OF A TUBE BEING SHAPED BY THE SELF HOOPING PROCESS.
APPLICATION FILED MAR. 31, 1919.

1,338,871.

Patented May 4, 1920.

E. SCHNEIDER.
APPARATUS FOR THE APPLICATION OF HYDRAULIC PRESSURE TO THE INTERIOR OF A TUBE
BEING SHAPED BY THE SELF HOOPING PROCESS.
APPLICATION FILED MAR. 31, 1919.

1,338,871.

Patented May 4, 1920.

Fig. 7.ª

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

APPARATUS FOR THE APPLICATION OF HYDRAULIC PRESSURE TO THE INTERIOR OF A TUBE BEING SHAPED BY THE SELF-HOOPING PROCESS.

1,338,871.      Specification of Letters Patent.      Patented May 4, 1920.

Application filed March 31, 1919. Serial No. 286,494.

*To all whom it may concern:*

Be it known that I, EUGÈNE SCHNEIDER, citizen of the French Republic, and a resident of 42 Rue d'Anjou, Paris, France, have invented a new and useful Improved Apparatus for the Application of Hydraulic Pressure to the Interior of a Tube Being Shaped by the Self-Hooping Process, which invention is fully set forth in the following specification.

This invention has for its object to provide an improved apparatus for the manufacture of metal tubes of great strength by the known process of "self-hooping" by means of hydraulic pressure applied to the interior of the tube to be shaped.

The improved apparatus consists essentially of a pair of crossheads serving as abutments for the two ends of the tube to be shaped, which engage therein. These crossheads are freely movable on suitable supports and are connected to each other by tie-rods of adjustable length. One of these crossheads is pierced by a duct for admitting liquid under pressure, while the other crosshead carries at its middle a closing device provided with an air discharge duct.

The main characteristic feature of the improved apparatus consists in the construction of the joints between the crossheads and the tube to be shaped. This peculiar construction assures a perfect tightness of the joints while affording these a very high degree of flexibility. The tightening of the said joints may also be effected automatically by the action of the pressure of the liquid employed in the "self-hooping" process.

Various constructional forms of this invention are illustrated by way of example in the accompanying drawings in their application to the "self-hooping" of a tube for guns of small calibers.

Figures 1 to 5 inclusive illustrate a first constructional example.

The improved apparatus comprises two crossheads A and B in which the ends $C^1$, $C^2$ of the tube C to be shaped, engage in suitable recesses $a$ and $b$ respectively. These crossheads rest on suitable supports on which they are freely movable. In the example shown, these supports consist of rails D on which rest rollers $A^1$, $B^1$, that are capable of running thereon and are mounted respectively on axle pins $a^1$ and $b^1$ formed on the said crossheads. These crossheads A and B may be mounted on their supports at a variable distance apart according to the length of the tube C to be shaped; they are connected to each other by tie-rods E, which may be provided with nuts $e$ on their screw-threaded ends for the purpose of adjustment of the entire arrangement.

The crosshead A is pierced by an axial duct $A^2$ for the admission of liquid under pressure; it may of course be constructed to receive any suitable union for a pipe connecting it to a pump or accumulator.

The crosshead B is constructed to receive at its center a closing device consisting of a valve seat F in which can work a screw-threaded plug such as for instance, a spindle G. The valve seat F is pierced by a duct $f$ for the escape of the air during the filling, and for emptying purpose at the end of the operation. The inner end of the valve seat F is of reduced diameter to form a piston $F^2$ that fits the orifice in the end $C^2$ of the tube.

The joint between the crosshead A and the end $C^1$ of the tube to be shaped, is constructed as follows:—

In the crosshead A and corresponding orifice in the end $C^1$ of the tube C there are formed chambers for the reception of a differential piston, H—I. The chamber $A^3$ formed in the crosshead A has a larger diameter than the chamber $c$ formed in the orifice of the tube-end $C^1$, while the diameter of the latter chamber is greater than the caliber of the tube to be shaped. The differential piston H—I is movable with its portion H of larger diameter in the chamber $A^3$ of the crosshead A, and with its portion I of smaller diameter in the chamber $c$ of the orifice in the tube-end $C^1$. Between the free end of the piston I and the shoulder $c^1$ formed by the end of the chamber $c$ there is arranged a jointing packing, consisting preferably as shown, of a ring J of hard rubber or other plastic material, placed between a locking ring $J^1$ and a split ring $J^2$ formed with an inner surface having a conicity corresponding to that of a union between the piston I and its guiding tail piece $i$.

Between the piston H and the end $a^3$ of the chamber $A^3$ in the crosshead A, there is provided a joint consisting of a ring K of plastic material slipped on the tail-piece $h$ of the piston H and bearing against a split ring $K^1$ that is similar to the ring $J^2$. L is a forcing ring. The differential piston $h$—H—I—$i$ is pierced by an axial duct N for the admission of the liquid under pressure.

Between the valve-seat F of the closing device F—G and the shoulder $c^2$ constituted by the end of the orifice $C^2$ there is arranged a joint packing which may consist, as shown, of a ring O of plastic material slipped on a tail-piece $F^1$ of the piston $F^2$ and situated between a split ring $O^1$ and a locking ring $O^2$.

Figures 4, 5:
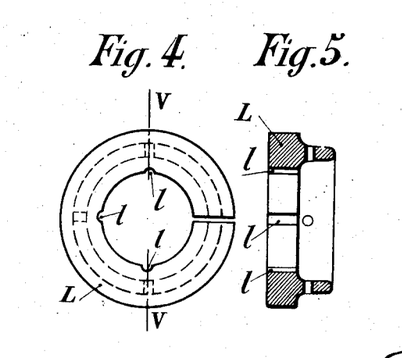
Figs. 4 and 5 are respectively an end view and a cross section on the line V—V of Fig. 4, showing the details of the driving ring of one of the joints.

The ring L shown in detail in Figs. 4 and 5 is split; its inner periphery fits the tail-piece of the piston H and is formed with spaced grooves $l$ to allow the liquid to pass between the said ring and the ring K.

In order to perform a "self-hooping" operation, liquid under pressure is admitted through the duct $A^2$. This liquid passes through the duct N into the bore of the tube to be "self-hooped." During the filling, the plug G is of course removed, and the air can escape through the duct $f$ and the hole in the valve-seat F.

Figure 1:
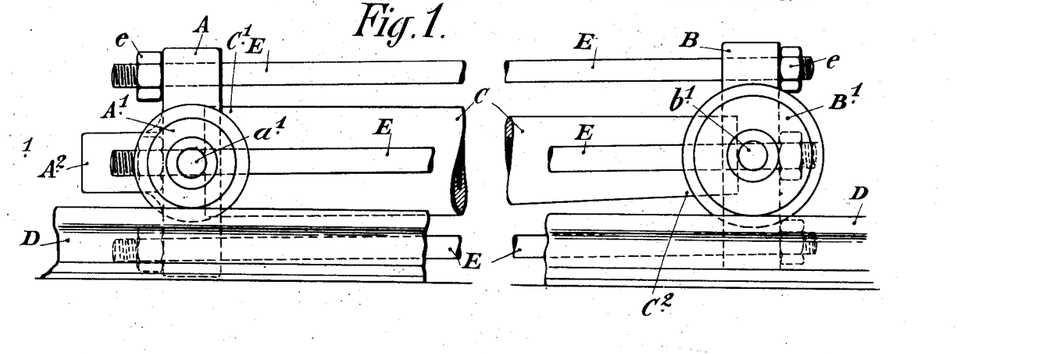
Fig. 1 is a side elevation of the entire apparatus.
Figure 2:
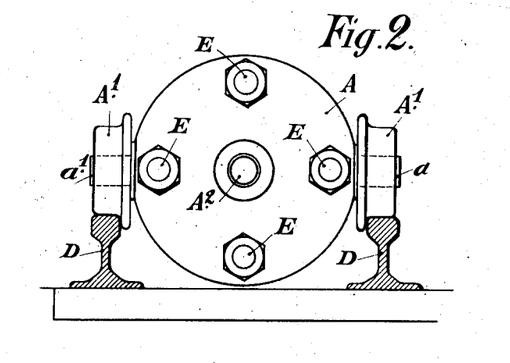
Fig. 2 is an end elevation viewed from the left of Fig. 1.

As shown in Fig. 1, the crosshead B is so constructed that the tube C is suitably inclined to the horizontal. For this purpose it is sufficient to provide the crosshead B with wheels $B^1$ of slightly larger diameter than the wheels $A^1$. This inclination of the tube is such as to raise slightly the end $C^2$ of the tube so that the air contained in the tube can readily escape through the duct $f$ in advance of the fluid-pressure entering the other end of the tube. When the bore of the tube C is filled, the valve plug G is replaced in position.

Tightness of the joint J is assured during the operation by the difference between the pressures acting upon the piston H in the direction of the arrow 1 and upon the piston I in the direction of the arrow 2. This difference of pressure tends to press the joint against the shoulder $c^1$. On the other hand the pressure acting upon the end $a^3$ of the chamber $A^3$, is transmitted through the crosshead A to the tie-rods E whereby a pull is exerted in the direction of the arrow 3. This pull is transmitted to the crosshead B so that the joint O is pressed by the piston $F^2$ against the shoulder $c^2$ in the direction of the arrow 4.

Figure 3:
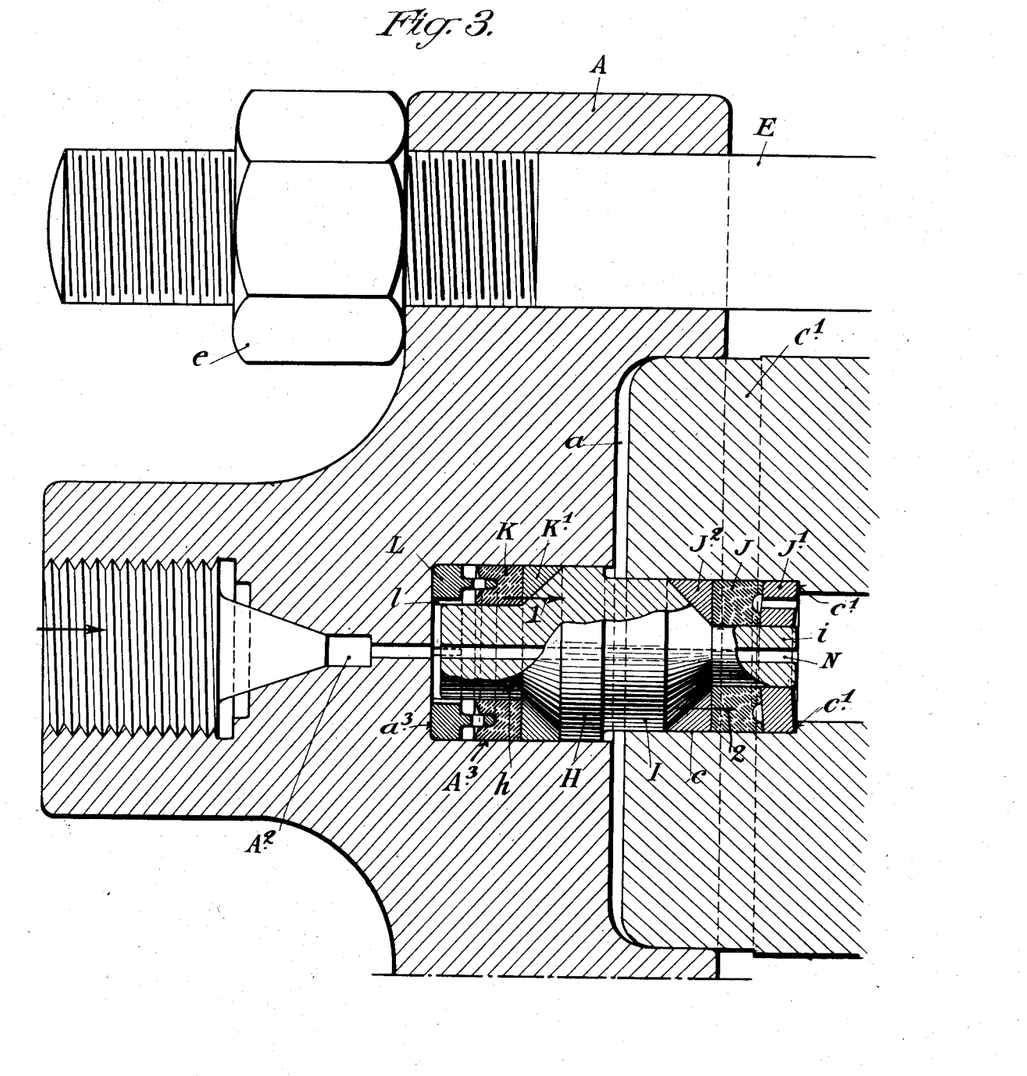
Figs. 3 and 3ª which are complements of each other, are a partial longitudinal section drawn to a larger scale, showing the details of the joints between the crossheads that support the tube to be shaped.
Figure 3A:
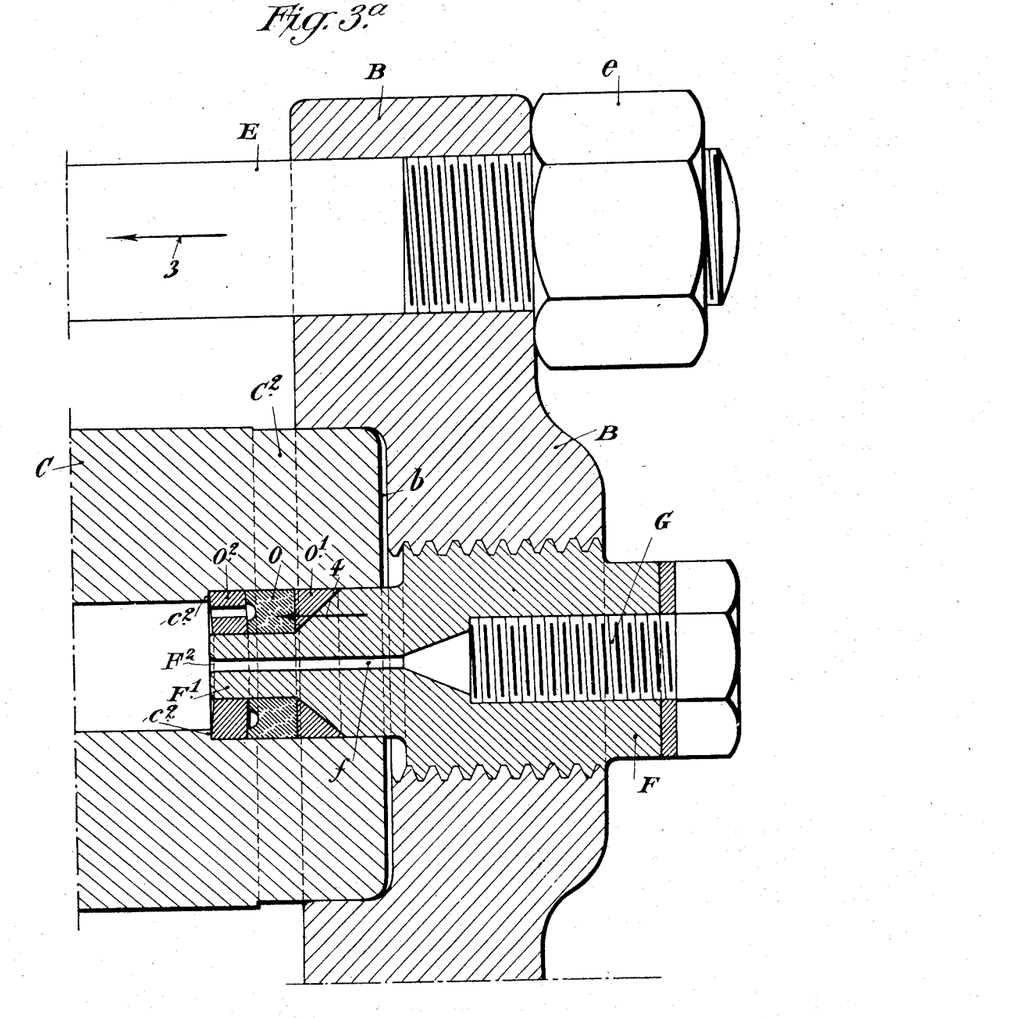
Figure 6:
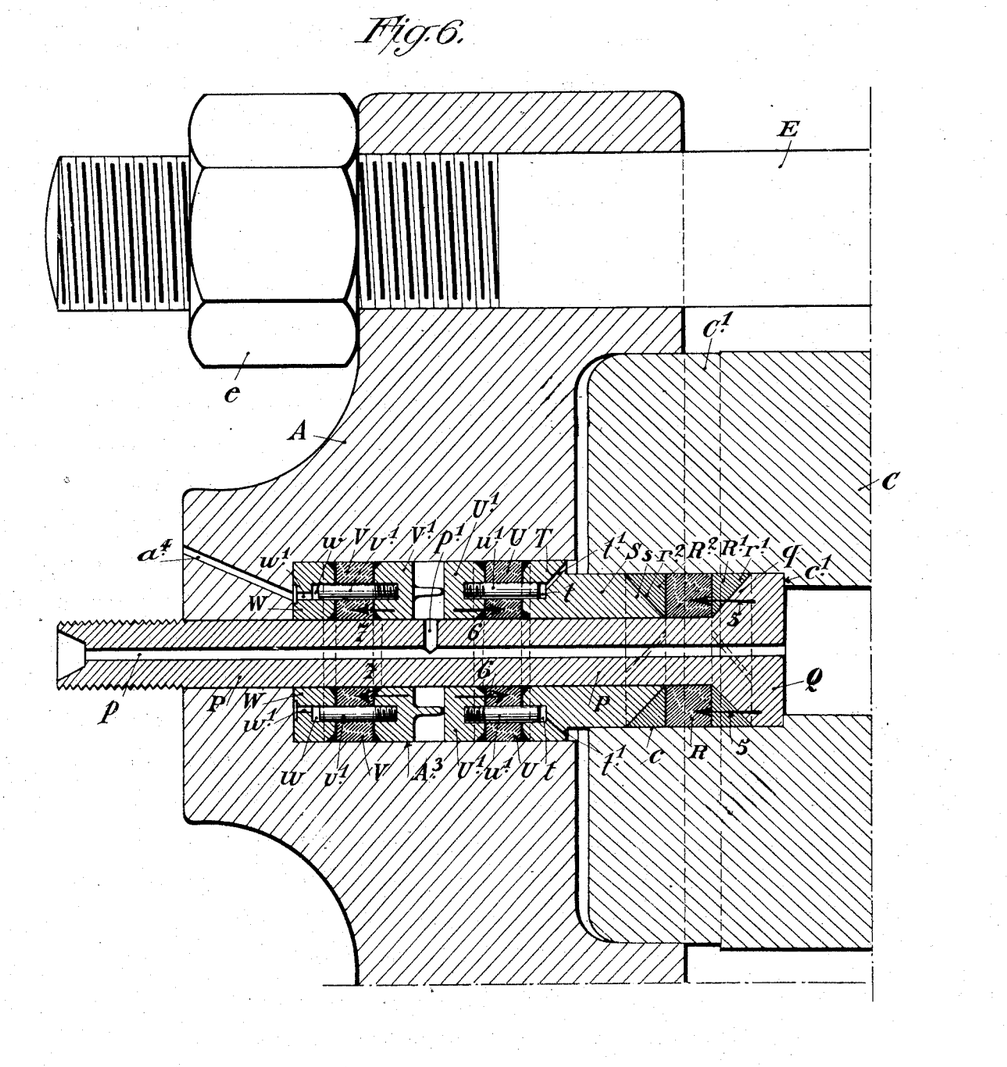
Figs. 6 and 6ª, which are complements of each other, are a section similar to that of Figs. 3 and 3ª, illustrate a first modification of the invention.

Figs. 6, $6^a$ are a section similar to that of Figs. 3, $3^a$; it illustrates a first modification of the joints between the crossheads A and B and the tube to be shaped.

In this example the admission of the liquid under pressure takes place through the axial duct $p$ in the rod P of a piston Q. This piston Q is movable in the chamber $c$ formed in the tube C; the rod P is guided in the crosshead A.

A first jointing ring R of special hard rubber or other plastic material, is arranged in the chamber $c$ around the rod P, and is retained between two split rings $R^1$, $R^2$, having outer beveled surfaces. The ring $R^1$ bears with its beveled surface $r^1$ against a corresponding bevel $q$ on the piston Q. The ring $R^2$ bears with its beveled surface $r^2$ against a bevel $s$ of a stepped sleeve S—T that is movable on the piston rod P. The portion S of smaller diameter is movable with slight friction in the chamber $c$, while the portion T of larger diameter is movable with slight friction in the chamber $A^3$ of the crosshead A.

The free end of the sleeve T forms an abutment for one of the ends of a second ring U of plastic material. The other end of this ring bears against a metal ring $U^1$ which is movable on the rod P and is provided with a series of tenons $u^1$ that pass through holes in the ring U and are capable of sliding in sockets $t$ formed in the sleeve T. The ends of these sockets $t$ communicate with the atmosphere through passage $t^1$. The liquid under pressure admitted through the duct $p$, enters through one or more branches $p^1$ into the chamber $A^3$ so that it can exert its pressure upon the abutment ring $U^1$.

A third ring V of plastic material is slipped on the rod P and retained between an abutment ring $V^1$ similar to the ring $U^1$ and provided with tenons $v^1$ movable in sockets $w$ formed in a metal abutment ring W. The ends of these sockets $w$ communicate through passages $w^1$ with a duct $a^4$ formed in the crosshead A and opening into the atmosphere.

Owing to the difference between the diameters of the piston Q and piston rod P, the piston and rod (Q—P) have a constant tendency to press the ring R in the direction of the arrows 5, thereby assuring a tight joint between the tube to be shaped and the piston.

On the other hand since the sockets $t$ communicate at their inner ends with the atmosphere, the ring U is subjected in the direction of the arrows 6 to a pressure that is equal to that of the liquid multiplied by the total cross section of the tenons $u^1$. The ring V is forced under the same pressure in the direction of the arrows 7, thereby assuring a tight joint between the movable rod P and the crosshead A.

In this example the screw plug G is fitted in the axial bore $x$ of a piston Y whose rod Z is guided in the crosshead B, while the piston Y works with slight friction in the chamber formed in the tube C, and bears normally against the shoulder $c^2$. A ring O of plastic material is held by means of two split metal rings $O^1$, $O^2$, between the piston Y and the valve-seat F in which the piston rod Z is movable.

Owing to the difference between the diameters of the piston Y and piston rod Z the ring O is pressed in the direction of the arrows 8 whereby a tight joint is assured between the tube to be shaped and the piston (Y—Z).

Figure 7:
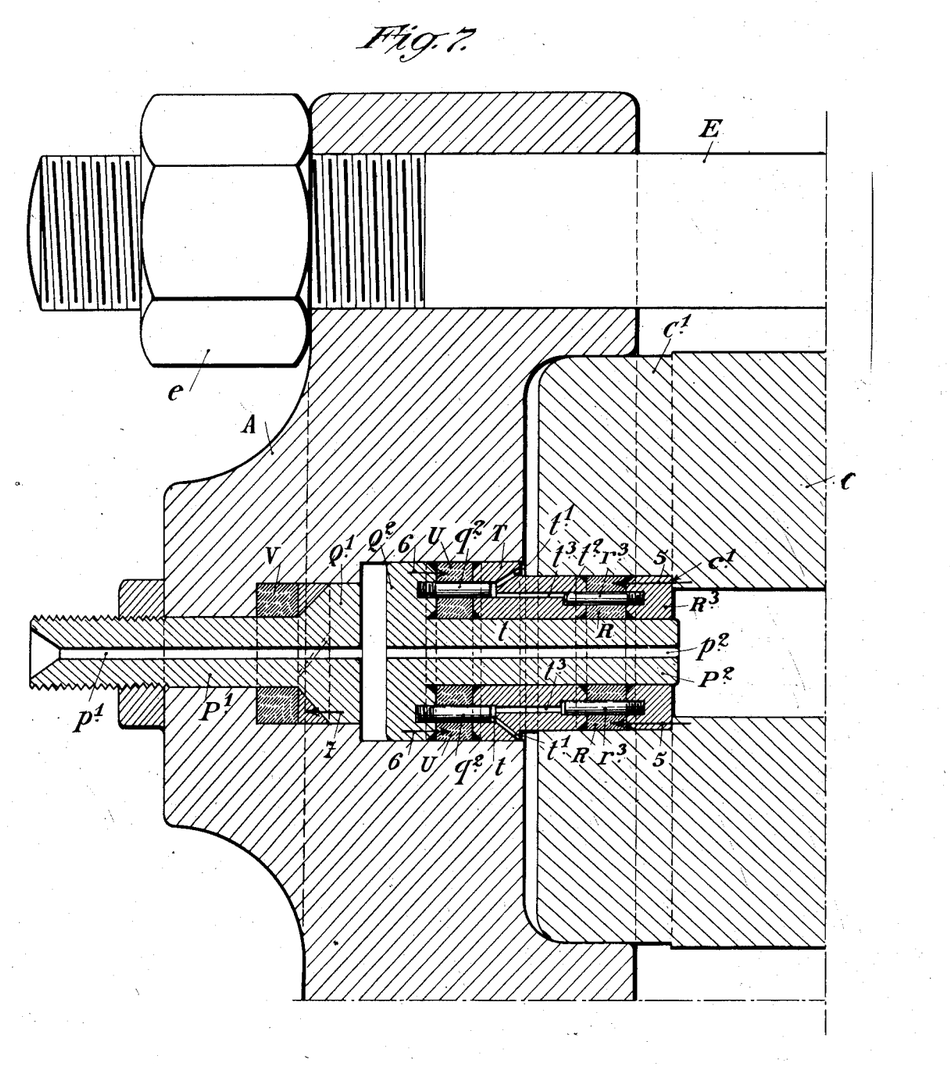
Figs. 7 and 7ª, which are complements of each other, show a similar view of a second modification.
Figure 7A:
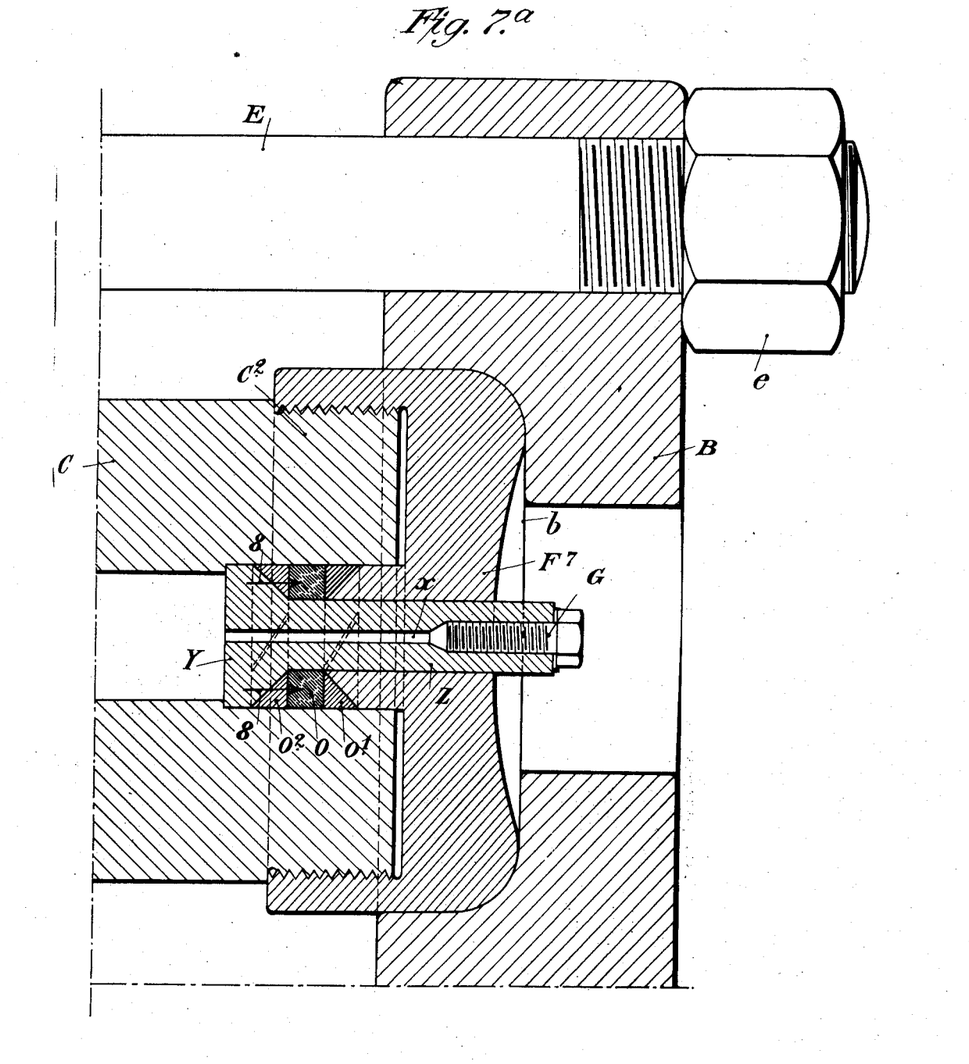

Figs. 7, 7$^a$ are a longitudinal section of a second modification of the improved construction of the joints.

In this example the piston (Q—P) of the preceding example is replaced by two separate members $Q^1$, $P^1$ and $Q^2$, $P^2$, for the formation of two joints having a movable piston-like member.

The piston $Q^1$ by compressing the plastic ring V assures a tight joint between the rod $P^1$ and the crosshead A.

The piston $Q^2$ has tenons $q^2$ which extend through the plastic ring U and enter sockets $t$ formed in the sleeve T; these sockets communicate through passages $t^1$ with the atmosphere. The compression of the ring U in the direction of the arrows 6 assures a tight joint between the piston $Q^2$, $P^2$, and the crosshead A.

The plastic ring R is compressed in the direction of the arrows 5 by a metal ring $R^3$ movable on the piston rod $P^2$ and provided with tenons $r^3$ that extend through the ring R and enter sockets $t^2$ in the sleeve T. These sockets communicate with the atmosphere through passages $t^3$ that open into the sockets $t$.

The screw plug G is fitted in the axial bore $x$ of a piston Y—Z which is similar in all respects to that of the preceding example. But in this example the said piston is movable in a plug $F^7$ screwing on the end $C^2$ of the tube to be shaped. This plug $F^7$ engages in a recess $b$ in the crosshead B.

What I claim is:—

1. An apparatus for applying hydraulic pressure to the interior of metal tubes in the "self-hooping" process, comprising two suitably supported sliding crossheads in which the ends of the tube to be shaped are engaged; the said crossheads being connected together by tie-rods of adjustable length, one of said crossheads serving as an abutment or a support for a closing device pierced by a duct for the discharge of liquid and the escape of air, while the other crosshead is constructed to form or receive a duct for the admission of liquid under pressure.

2. An apparatus as claimed in claim 1, wherein the joints between the tube to be shaped and the supporting crossheads comprise:—($a$) as to the crosshead through which the liquid under pressure is admitted, a differential piston pierced by a duct for the admission of the liquid, and of which the portion of larger diameter is movable in the said crosshead, while the portion of smaller diameter is movable in the orifice of the tube to be shaped; packing being provided between the outer ends of these pistons and the ends of the chambers that are formed respectively in the crosshead and tube, wherein these pistons are movable; ($b$) as to the other crosshead, a packing arranged around a reduced portion of the closing device between the shoulder formed by the said reduced portion and a shoulder formed at the inner end of the orifice of the tube to be shaped; and wherein the tightness of the first mentioned joint is assured by the difference between the pressures upon the two portions of the differential piston; the pressure upon this movable piston being transmitted by the corresponding crosshead to the tie-rods whose pull upon the other crosshead assures the tightness of the joint between the latter and the corresponding orifice of the tube to be shaped.

3. An apparatus as claimed in claim 1, wherein the duct for the admission of the liquid under pressure in one of the crossheads is constituted by the axial bore of a piston rod which is guided in the said crosshead, while the piston itself is guided in the orifice of the tube to be shaped; the said piston and rod allowing of the formation of a joint having a movable head on a plastic ring for effecting a tight closure of the orifice of the tube to be shaped; and other joints having movable heads on plastic rings slipped on the said piston rod, compressed between a metal abutment ring subjected on one face to the pressure of the liquid, and provided on its opposite face with tenons engaging in sockets in a counter-ring which communicate with the atmosphere.

4. An apparatus as claimed in claim 1, wherein the admission of the liquid under pressure in one of the crossheads is effected through axial bores in the rods of two pistons, which latter constitute movable heads for assuring tightness of the plastic ring joints in the second mentioned crosshead and the orifice of the tube to be shaped.

5. An apparatus as claimed in claim 1, wherein the escape of the air and the discharge of the liquid take place through the axial bore of a piston and piston rod of which the piston is movable in the orifice of the tube to be shaped and constitutes a movable head for effecting the tightening of a plastic ring, the said piston rod containing the closing device and being adapted to be guided in a seat in the first mentioned crosshead.

6. An apparatus for applying fluid-pressure to the interior of metal tubes in the "self-hooping" process, comprising closures movable in the orifices at the ends of the tube being treated to receive the outward axial thrust of the fluid-pressure contained in the tube, means for conducting fluid-pressure into the tube, and means connecting the two closures so that the outward thrust imparted to one by the fluid-pressure will be transmitted into an inward pull on the other to hold the closures in closed engagement with their respective orifices.

7. An apparatus for applying fluid-pressure to the interior of metal tubes in the "self-hooping" process, comprising closures movable in the orifices at the ends of the tube being treated to receive the outward axial thrust of the fluid-pressure contained in the tube, means for conducting fluid-pressure into the tube, an expansible packing associated with each closure to be expanded by the movement of the closure in its orifice to prevent leakage, and means connecting the two closures so that the outward thrust imparted to one by the fluid-pressure will be transmitted into an inward pull on the other to hold the closures in closed engagement with their respective orifices.

8. An apparatus for applying fluid-pressure to the interior of metal tubes in the "self-hooping" process, comprising pistons movable in the orifices at the ends of the tube being treated to receive the outward axial thrust of the fluid-pressure contained in the tube, means for conducting fluid-pressure into the tube, and means connecting the two pistons so that the outward thrust imparted to one by the fluid-pressure will be transmitted into an inward pull on the other to hold the pistons in closed engagement with their respective orifices.

9. An apparatus for applying fluid-pressure to the interior of metal tubes in the "self-hooping" process, comprising pistons movable in the orifices at the ends of the tube being treated to receive the outward axial thrust of the fluid-pressure contained in the tube, means for conducting fluid-pressure into the tube, an expansible packing carried by each piston to be expanded in the orifice by the movement of the piston to prevent leakage, and means connecting the two pistons so that the outward thrust imparted to one by the fluid-pressure will be transmitted into an inward pull on the other to hold the pistons in closed engagement with their respective orifices.

10. An apparatus for applying fluid-pressure to the interior of metal tubes in the "self-hooping" process, comprising pistons movable in the orifices at the ends of the tube being treated to receive the outward axial thrust of the fluid-pressure contained in the tube, one of said pistons having a duct to convey fluid-pressure into the interior of the tube and the other piston having a controlled discharge-duct leading from the interior of the tube, and means connecting the two pistons so that the outward thrust imparted to one by the fluid-pressure will be transmitted into a pull on the other to hold the pistons in closed engagement with their respective orifices.

11. An apparatus for applying fluid-pressure to the interior of metal tubes in the "self-hooping" process, comprising two relatively adjustable opposite crossheads to engage the ends of the tube to be treated, one of said cross-heads having a duct for the fluid-pressure leading to the interior of the engaged tube, a closure carried by each crosshead closing the orifice of the engaged end of the tube to receive the outward axial thrust of the contained fluid-pressure and to transmit the force of such thrust to the crosshead, and adjustable means connecting the two crossheads to transmit the outward thrust imparted to one into a pull on the other to hold the closures in closed engagement with their respective orifices.

12. An apparatus for applying fluid-pressure to the interior of metal tubes in the "self-hooping" process, comprising two opposite crossheads to engage the ends of the tube to be treated, one of said crossheads having a duct for the fluid-pressure leading to the interior of the engaged tube, a closure carried by each crosshead closing the orifice of the engaged end of the tube to receive the outward axial thrust of the contained fluid-pressure and to transmit the force of such thrust to the crosshead, and means connecting the two crossheads to transmit the outward thrust imparted to one into a pull on the other to hold the closures in closed engagement with their respective orifices.

13. An apparatus for applying fluid-pressure to the interior of metal tubes in the "self-hooping" process, comprising two opposite crossheads to engage the ends of the tube to be treated, one of said crossheads having a duct for the fluid-pressure leading to the interior of the engaged tube, a closure including an expansible packing carried by each crosshead closing the orifice of the engaged end of the tube and the expansible packing operating to prevent leakage, said closure operating to receive the outward axial thrust of the contained fluid-pressure and to transmit the force of such thrust to the crosshead, and means connecting the two crossheads to transmit the outward thrust imparted to one into a pull on the other to hold the closures and their associated packings in closed engagement with their respective orifices.

14. An apparatus for applying fluid-pressure to the interior of metal tubes in the "self-hooping" process, comprising two opposite crossheads to engage the ends of the tube to be treated, one of said crossheads having a duct for the fluid-pressure leading to the interior of the engaged tube, a piston carried by each crosshead entering the orifice of the engaged end of the tube to close said orifice and to receive the axial thrust of the contained fluid-pressure to transmit the force of such thrust to the crosshead, and means connecting the two crossheads to transmit the outward thrust imparted to one into a pull on the other to hold the pistons in closed engagement with their respective orifices.

15. An apparatus for applying fluid-pressure to the interior of metal tubes in the "self-hooping" process, comprising two opposite crossheads to engage the ends of the tube to be treated, one of said crossheads having a duct for the fluid-pressure leading to the interior of the engaged tube, a piston carried by each crosshead entering the orifice of the engaged end of the tube to close said orifice and to receive the axial thrust of the contained fluid-pressure to transmit the force of such thrust to the crosshead, means connecting the two crossheads to transmit the outward thrust imparted to one into a pull on the other to hold the piston in closed engagement with their respective orifices, and an expansible packing in each orifice of the tube to be expanded therein by the piston moving in said orifice to prevent leakage.

16. An apparatus for applying fluid-pressure to the interior of metal tubes in the "self-hooping" process, comprising two opposite crossheads to engage the ends of the tube to be treated, one of said crossheads having a duct for the fluid-pressure leading to the interior of the engaged tube, a piston carried by each crosshead entering the orifice of the engaged end of the tube, each piston having on its inner end a tail-piece of reduced diameter carrying an expansible packing to be expanded in the orifice by the inward movement of the piston, said piston operating to receive the outward axial thrust of the confined fluid-pressure to transmit the force of such thrust to the crosshead, and means connecting the two crossheads to transmit the outward thrust imparted to one into a pull on the other to hold the pistons and their associated packings in closed engagement with their respective orifices.

17. An apparatus for applying fluid-pressure to the interior of metal tubes in the "self-hooping" process, comprising two opposite crossheads to engage the ends of the tube to be treated, one of said crossheads having a duct for the fluid-pressure leading to the interior of the engaged tube, a piston carried by each crosshead entering the orifice of the engaged end of the tube, each piston having on its inner end a tail-piece of reduced diameter and a conical part intermediate the body of the piston and the tail-piece, a locking ring on each tail-piece to abut a shoulder on the wall of the tube-orifice, a split ring on the conical part of each piston, a packing ring on each tail-piece between the locking ring and the split ring, each piston operating to receive the outward axial thrust of the contained fluid-pressure to transmit the force of such thrust to its crosshead, and means connecting the two crossheads to transmit the outward thrust imparted to one into a pull on the other to hold the pistons in closed engagement with their respective orifices, the inward thrust of the pistons operating to expand the packing rings between their respective locking and split rings to prevent leakage.

18. An apparatus for applying fluid-pressure to the interior of metal tubes in the "self-hooping" process, comprising two opposite crossheads to engage the ends of the tube to be treated, a piston carried by one of said crossheads entering the orifice of the engaged end of the tube to close said orifice and to receive the axial thrust of the contained fluid-pressure to transmit the force of such thrust to the crosshead, an expansible packing in said orifices to be expanded by the inward movement of the piston to prevent leakage, the other of said crossheads having a cylindrical chamber of greater diameter than the orifice in the engaged end of the tube, said latter crosshead having a duct for the fluid-pressure leading into the outer end of the cylindrical chamber therein, a differential piston having an enlarged portion registering with the cylindrical chamber and a reduced portion registering with the adjacent orifice of the tube, said differential piston having a duct leading from the cylindrical chamber to the interior of the tube, a packing on the inner end of the differential piston tò be expanded in the orifice by the inward movement of said piston to prevent leakage, and means connecting the two crossheads, said differential piston through the greater pressure on its outer end through the fluid-pressure in the cylindrical chamber moving inward against the fluid-pressure contained in the tube to expand its packing, the reaction of the fluid-pressure in the cylindrical chamber pressing the crosshead outward to exert through the connecting means a pull on the other crosshead to force the piston carried by the latter inwardly to expand its packing.

In testimony whereof I have signed this specification.

EUGÈNE SCHNEIDER.